G. W. HADFIELD & F. E. CLARK.

Assignors to W. H. LUM.

Lamp and Holder.

No. 9,423. Reissued Oct. 19, 1880.

WITNESSES

Wille R Omshundro

J. A. Woodworth

INVENTOR

George W. Hadfield

Frank E. Clark

By Myers & Co

ATTORNEYS.

N. PETERS. PHOTO-LITHOGRAPHER, WASHINGTON, D. C.

UNITED STATES PATENT OFFICE.

GEORGE W. HADFIELD AND FRANK E. CLARK, OF BROOKLYN, NEW YORK, ASSIGNORS TO WILLIAM H. LUM.

LAMP AND HOLDER.

SPECIFICATION forming part of Reissued Letters Patent No. 9,423, dated October 19, 1880.

Original No. 172,429, dated January 18, 1876. Application for reissue filed June 30, 1880.

*To all whom it may concern:*

Be it known that we, GEO. W. HADFIELD and FRANK E. CLARK, of Brooklyn, in the county of Kings and State of New York, have invented certain new and useful Improvements in Lamps and Holders; and we do hereby declare that the following is a full, clear, and exact description of the invention, that will enable others skilled in the art to which it appertains to make and use the same, reference being had to the accompanying drawings, and to the letters of reference marked thereon, which form a part of this specification.

Our invention consists in a novel construction and combination of a lamp fount or reservoir and a holder for the same, whereby provision is made for attaching said holder to a gas fixture or bracket, and for readily connecting and disconnecting the lamp to and from the holder.

In carrying out our invention we construct the fount or reservoir with two parallel ribs or flanges on or near its bottom, extending laterally in opposite directions. The lamp-holder consists of a plate having its edges turned upward and then inward toward each other, for engagement with the ribs or flanges on the lamp, so as to overhang and clamp the same. The lamp-holder is provided with a socket having an internal screw-thread corresponding with the threads by which gas-burners are attached to ordinary gas fixtures or brackets, so that the lamp and holder may be readily connected to and supported by a burner arm or bracket by removing the burner and attaching the lamp-holder in its stead.

The accompanying drawings illustrate a mode of carrying out our invention.

Figure 1:
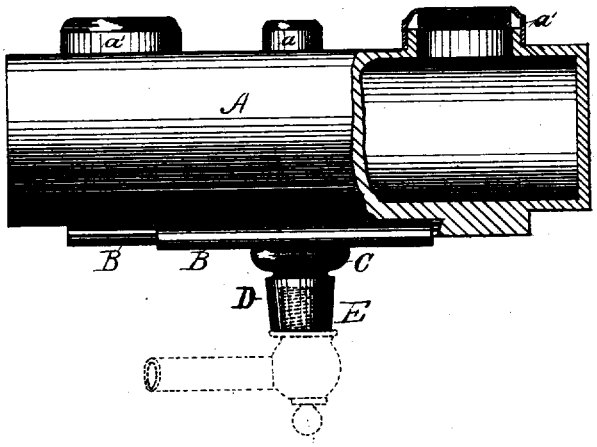
Figure 2:
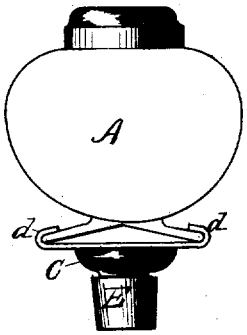

Figure 1 is a side view with a portion of a burner-arm shown in dotted lines; Fig. 2, an end view of the lamp and holder.

The fount or reservoir A may be of any suitable material; but it is preferably transparent, in order to present little or no obstruction to the downward passage of the light. It may be, for some purposes, of greater length than width, as shown in the drawings, Fig. 1. By this form we greatly increase its holding capacity and avoid increasing the diameter under the burner, which would cause a shadow, and this form of body can be provided with two or more openings for burners and feeding-cap, *a′ a* and *a′*.

On or near the bottom of the fount are two ribs or flanges, B B, which extend laterally in opposite directions, and run about parallel with each other longitudinally for any suitable distance.

The lamp-holder consists of a plate, C, of cast or sheet metal or other suitable material, having its edges *d d* turned upward and then inward toward each other, so as to overhang and clamp the edges of the flanges B B on the lamp A between and under the turned-in edges *d d*.

The lamp-holder is provided on its bottom with a socket, E, which is preferably made in one piece with the plate C. On the internal surface of this socket is a screw-thread corresponding with the threads by which gas-burners are attached to arms or brackets.

By removing the burner from its seat the lamp-holder C may be readily screwed onto one of these arms or brackets in place of the burner, and thus provide for supporting the lamp A by said arm or bracket.

The plate of the holder forms a firm support for the lamp, and the projecting lugs secure the same and prevent its being knocked off by accident.

By the use of this invention the occupants of stores, dwellings, or other buildings are enabled to utilize their gas-fixtures in cases where they are not supplied with gas or prefer to use oil instead thereof; and the peculiar construction of the lamp enables it to be readily detached from the holder and carried about or used in the same manner as an ordinary lamp.

What we claim as new, and desire to secure by Letters Patent, is—

1. The combination, with a lamp provided on its base with parallel flanges, as described, of a lamp-holder having upwardly and inwardly turned parallel flanges for embracing the flanges of the lamp, substantially as set forth.

2. The combination, with a lamp provided with parallel flanges, as described, of a lamp-holder provided with a socket for attaching it to a gas-burner arm or bracket, and having upwardly and inwardly turned parallel flanges for embracing the flanges on the lamp, substantially as set forth.

In testimony that we claim the foregoing we have hereunto set our hands this 4th day of June, 1880.

G. W. HADFIELD.
FRANK E. CLARK.

Witnesses:
R. J. BANFIELD,
R. D. TUTWILER.